United States Patent Office 2,971,621
Patented Feb. 14, 1961

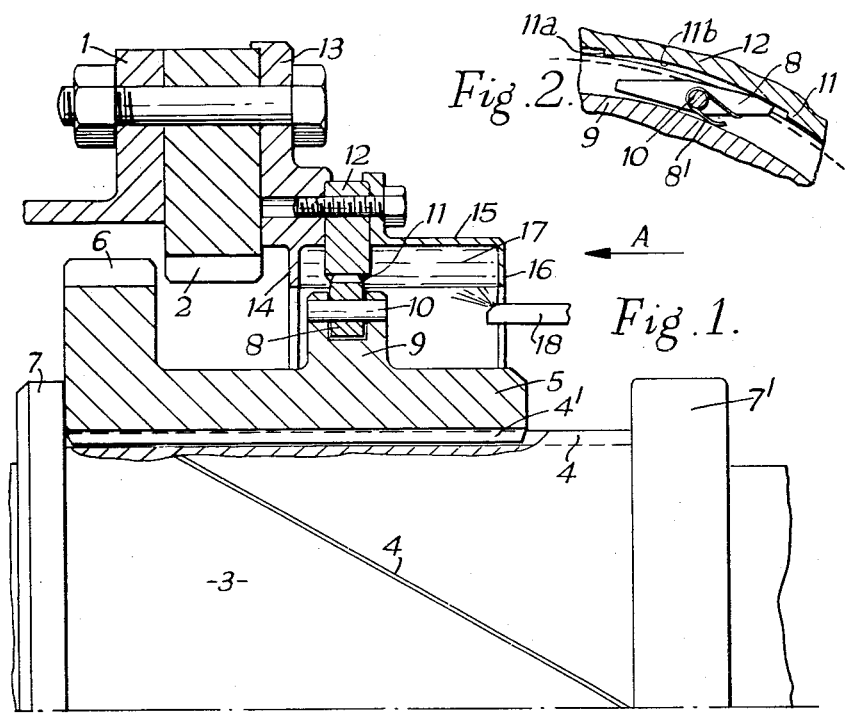
Fig. 2.
Fig. 1.
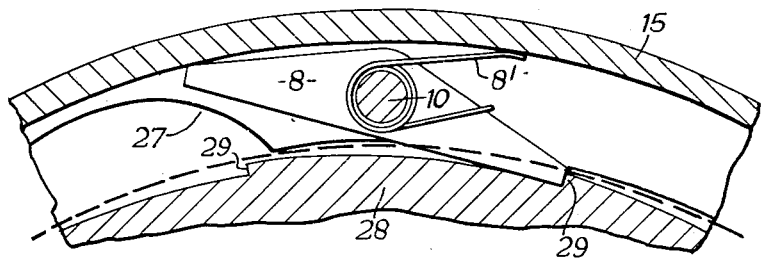
Fig. 5.
INVENTOR
Harold Sinclair
Philip John Short
BY
Benjamin Sweedler
ATTORNEY

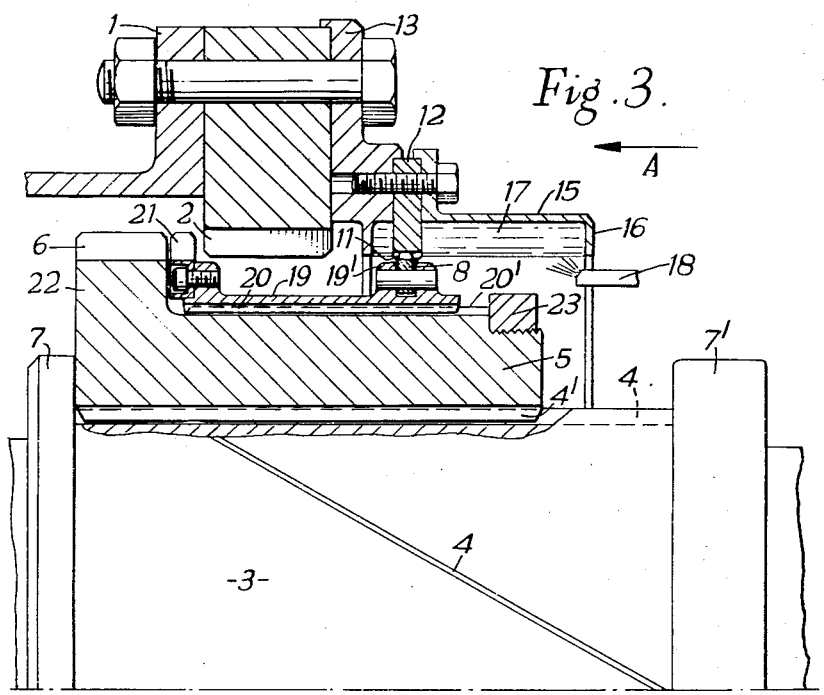
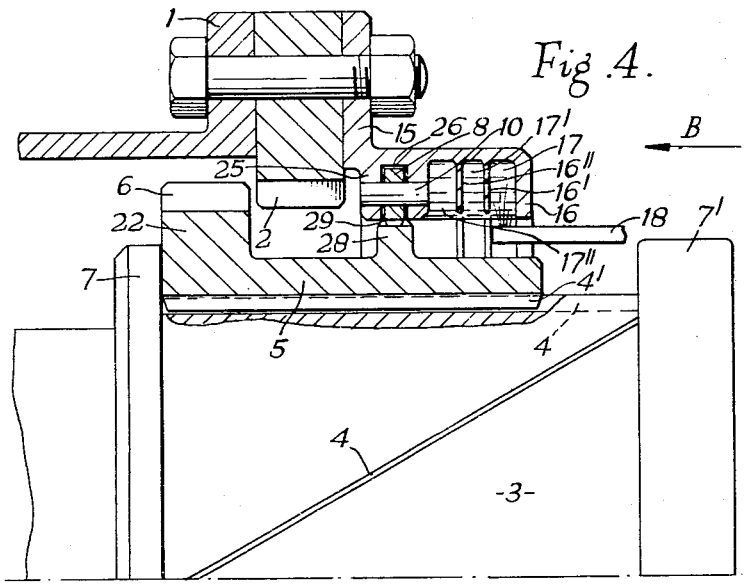

2,971,621
SYNCHRONOUS SELF-SHIFTING CLUTCHES

Harold Sinclair, Windsor, and Philip J. Short, Wokingham, England, assignors to S.S.S. Gears Limited, Isleworth, England, a British company Filed Aug. 20, 1957, Ser. No. 679,228
Claims priority, application Great Britain Nov. 7, 1956
12 Claims. (Cl. 192—67)

This invention relates to synchronous self-shifting clutches of the type comprising a first clutch member provided with clutch teeth, a second clutch member mounted co-axially with said first clutch member, an intermediate member, provided with clutch teeth, carried by said second clutch member and constrained for helical movement with respect thereto into and out of toothed engagement with said first clutch member, and a ratchet drive for effecting precise inter-engagement of the clutch teeth of said intermediate member with the clutch teeth of said first clutch member.

The said ratchet drive comprises one or more pawls or the equivalent carried by one of said first and intermediate members and adapted to co-operate with projections, e.g. ratchet teeth, carried by the other of said first and intermediate members. The term "pawls or the equivalent" used herein includes spring actuated pawls that are angularly movable in radial sense with respect to the clutch axis, as described, for example, in British patent specification No. 645,528.

In connection with clutches of this type, problems arise as the ratcheting speed and duration and the size of the clutch are increased, due to the increasing tendency of the pawls to chatter and rebound, with consequent impact on the backs of the pawls, with resulting wear on the pawls and the coacting surfaces of the ratchet teeth. The object of the present invention is to provide a clutch of the type referred to, in which these difficulties are reduced or eliminated.

According to the present invention there is provided a synchronous self-shifting clutch of the type referred to, wherein ratcheting movement of the said pawl or pawls is damped by an annulus of liquid which is substantially undisturbed by parts in motion relative thereto, at least in the vicinity of said ratchet drive.

According to the invention also there is provided a synchronous self-shifting clutch of the type referred to, wherein ratcheting movement of the pawl or pawls is damped by an annulus of liquid which is clear of disturbance due to the relative rotation of the clutch teeth of said first and intermediate members.

In order that the invention may be clearly understood and readily carried into effect it will now be described in more detail with reference to the accompanying drawings in which:

Fig. 1 is a longitudinal half-section of a clutch according to the invention, wherein the first clutch member rotates in clockwise sense as viewed in the direction of arrow A and the first clutch member carries a ratchet ring, Fig. 2 is a detail view looking in the direction of arrow A of Fig. 1, of part of a ratchet ring and one of the pawls with which the clutch of Fig. 1 is provided, Fig. 3 is a longitudinal half-section of another clutch according to the invention in which an auxiliary member is employed, the first clutch member again rotating in clockwise sense as viewed in the direction of arrow A and carrying a ratchet ring, Fig. 4 is a longitudinal half-section of a further clutch according to the invention, wherein the first clutch member rotates in anti-clockwise sense as viewed in the direction of arrow B, and wherein ratchet teeth are carried by the intermediate member, and Fig. 5 is a detail view on a larger scale than Fig. 4, looking in the direction of arrow B of Fig. 4 of the pawls and ratchet ring of the clutch shown in Fig. 4.

Referring to Figs. 1 and 2, the first clutch member 1 is provided with a ring of wide clutch teeth 2, and the second clutch member is a shaft 3 formed with external right-handed helical splines 4. On the shaft 3 is mounted an intermediate member 5 formed with wide clutch teeth 6, the intermediate member 5 being formed with internal helical splines 4' that co-act with the external splines 4 on the shaft 3, so that the intermediate member 5 is constrained for right-handed helical movement relative to the shaft 3 between axial stops 7 and 7' thereon. In the left-hand end position of the intermediate member 5 as shown in Fig. 1 the clutch teeth 6 thereon are to the left of and disengaged from the clutch teeth 2 of the first clutch member 1. A plurality of pawls 8 provided with control springs 8' are disposed in an annular groove in a flange 9 on the intermediate member 5, the pawls 8 being mounted on pivot pins 10 which are parallel to the clutch axis. In the said left-hand end position of the intermediate member 5 the pawls 8 are in ratcheting position with respect to narrow ratchet teeth 11 formed internally in a ring 12 carried by the first clutch member 1 (see Fig. 2). The ring 12 is mounted between two annular members, one 13 of which is at the right-hand end of the first clutch member and is formed with a radially inwardly projecting flange 14, and the other 15 of which is at the right-hand side of the ring 12, and is formed with a radially inwardly projecting flange 16.

The two annular members 13 and 15 with their flanges 14 and 16 together form an annular chamber 17 which is open towards the clutch axis, and the radial inner diameter of which, as determined by the flanges 14 and 16, is slightly larger than the outer diameter of the flange 9 in which the pawls 8 are carried. A stationary pipe 18 leading from a source of oil is adapted to supply a jet of oil to the interior of the chamber 17.

In the operation of the clutch, if it is assumed that the first clutch member 1 rotates in clockwise direction when viewed in the direction of arrow A of Fig. 1 and the shaft 3 is stationary, the ratchet teeth 11 ratchet over the noses of the pawls 8. Oil is continuously fed to the annular chamber 17 from the pipe 18, so that there is formed a rotating annulus of oil, the radially inner surface of which is, as shown, just clear of the flange 9. The ratchet teeth 11 are wholly submerged in this annulus of oil, and the noses of the pawls 8 project into the said annulus as shown in Fig. 2, wherein the dotted line represents the oil lever, so that the ratcheting movement of the pawls is damped, the damping effect being increased with the speed of rotation of the clutch member 1 relative to the shaft 3, and the resulting increase in centrifugal force on the oil in the annulus. It is advantageous to make the nose of the pawl slightly heavier than the tail so that as the speed of the rotation of the shaft 3 increases the net weight of the nose increases as the centrifugal pressure of the annulus of oil increases.

Since the ratchet teeth 11 rotate with the annulus of oil, and no clutch parts that move relatively to the annular chamber 17 project into the oil annulus apart from the tips of the pawls 8, the ratcheting motion of which it is desired to damp, the bulk of the oil in the chamber 17 is substantially otherwise undisturbed and is free to rotate with the annular chamber 17.

If now the shaft 3 is accelerated in the same direction of rotation as the first clutch member 1, when the shaft 3 tends to overrun the first member 1 one or more pawls 8 is or are picked up by ratchet teeth 11, and the intermediate member 5 is moved helically along the shaft 3 until it abuts the right-hand axial stop 7'. During the initial part of this movement of the intermediate member 5, the clutch teeth 6 thereon are brought cleanly into engagement with the clutch teeth 2 of the first clutch member 1, and during the further movement of the intermediate member 5 that brings the clutch teeth 6 and 2 into full interengagement the pawls 8 are moved axially out of engagement with the ratchet teeth 11.

When the intermediate member 5 has engaged the right-hand axial stop 7', the clutch teeth 6 and 2 of the first and intermediate members respectively are in full engagement and the pawls 8 are to the right of and free from the ratchet teeth 11. The clutch is now fully engaged for the transmission of power from the shaft 3 to the first clutch member 1.

If the speed of the shaft 3 is now reduced so as to allow the first clutch member 1 to overrun the shaft 3, the co-action between the clutch teeth 6 and 2 causes the intermediate member 5 to move helically along the shaft 3 to the left, until it again abuts the left-hand axial stop 7. During this movement, the clutch teeth 6 of the intermediate member 5 disengage from the clutch teeth 2 of the first clutch member 1, and the pawls 8 are brought into ratcheting engagement with the ratchet teeth 11, being again subject to the damping effect of the otherwise undisturbed annulus of oil in the chamber 17.

It is normally the practice with clutches of the above-mentioned type to arrange for the pawls to co-operate directly with the clutch teeth of the first clutch member, the said clutch teeth 2, which are conveniently of involute form, thus serving also as ratchet teeth. The use of a separate ring of ratchet teeth 11 as shown enables the ratchet teeth to be independent in shape of the tooth form of the internal clutch teeth 2 and to be fewer in number, so that the ratchet ring 12 can be designed so as to give the best ratcheting action and so as to lengthen the ratcheting period, i.e., the time between ratcheting of successive teeth 11 over each pawl 8.

For example, the first clutch member 1 may have 56 clutch teeth 2, and the ratchet ring 12 may have 14 teeth 11, each having, as shown in Fig. 2, a short pawl-engaging flank 11a and a long spiral flank 11b leading from the root of each ratchet tooth 11 to the apex of an adjacent ratchet tooth 11. There may be four pairs of diametrically opposite pawls 8, with their pawl pins 10 pitched to enable a pair of pawls to engage ratchet teeth 11 in each of the 56 positions in which the clutch teeth 6 of the intermediate member 5 can engage cleanly with the clutch teeth 2 of the first clutch member 1.

In the embodiment of the invention shown in Fig. 3, the pawls 8 are mounted in a flange 19' formed on an auxiliary member 19 of relatively low inertia which is mounted on the intermediate member 5 and is constrained to move helically relative thereto by the interengagement of internal right-handed helical splines 20 in the auxiliary member 19 and external splines 20' on the intermediate member 5. These splines are of the same hand as the splines 4 and 4'. The auxiliary member 19 carries a ring of narrow auxiliary teeth 21 which, in the disengaged condition of the clutch are situated axially between the clutch teeth 6 of the intermediate member 5 and the clutch teeth 2 of the first clutch member 1. In other respects the construction is similar to that shown in Figs. 1 and 2, and in Figs. 1 and 3 similar reference numerals are used for corresponding parts.

In the disengaged condition of the clutch the intermediate member 5 abuts against the left-hand axial stop 7 on the shaft 3, and the left-hand end of the auxiliary member 19 abuts against a flange 22 on which the clutch teeth 6 of the intermediate member 5 are formed.

While the first clutch member 1 is overrunning the shaft 3, in the clockwise sense as viewed in the direction of arrow A, the teeth 11 of the ratchet ring 12 ratchet over the pawls 8. When the shaft 3 is accelerated and tends to overrun the first clutch member 1, one or more pawls 8 is or are engaged by ratchet teeth 11 and the auxiliary member 19 is thereby moved helically to the right along the intermediate member 5 into engagement with an axial stop 23 on the intermediate member 5. The auxiliary teeth 21 are thereby brought into part engagement with the clutch teeth 2 of the first clutch member 1, and the pawls 8 are moved axially out of the path of the ratchet teeth 11, whereupon the coaction of the auxiliary teeth 21 and the clutch teeth 2 moves the auxiliary member 19 further to the right and thereby moves the intermediate member 5 helically to the right, so that the clutch teeth 6 of the intermediate member 5 are brought cleanly into engagement with the clutch teeth 2 of the first clutch member 1. When the intermediate member 5 has reached its right-hand axial stop 7', the two sets of clutch teeth 6 and 2 are fully engaged and the auxiliary teeth 21 are to the right of, i.e., clear of, the clutch teeth 2 of the first clutch member 1.

When the speed of shaft 3 is reduced and the first clutch member 1 overruns the shaft 3, the intermediate member 5 moves to the left, up to its left-hand axial stop 7, thereby bringing its clutch teeth 6 out of engagement with the clutch teeth 2 and the auxiliary teeth 21 are moved to the left into engagement with the clutch teeth 2. The co-action between the auxiliary teeth 21 and the clutch teeth 2 then moves the auxiliary member 19 to the left up to the flange 22 of the intermediate member 5, thereby bringing the auxiliary teeth 21 out of engagement with the clutch teeth 2 of the first clutch member 1 and bringing the pawls 8 back into ratcheting engagement with the ratchet teeth 11, so that the pawls are again subject to the damping effect of the otherwise undisturbed annulus of oil in chamber 17.

Whereas in both of the foregoing constructions the pawls are carried by a member that is in turn carried by the second clutch member (the pawls 8 being carried by the intermediate member 5 in Fig. 1 and by the auxiliary member 19 in Fig. 3), in the clutch now to be described with reference to Figs. 4 and 5 the pawls are carried by the first clutch member, and the ratchet teeth are carried by the intermediate member.

Referring to Figs. 4 and 5, the first clutch member 1 carries a ring of clutch teeth 2, and the second clutch member is a shaft 3 formed with external left-handed helical splines 4. An intermediate member 5 is formed with internal helical splines 4' that co-act with the splines 4 to constrain the intermediate member 5 for helical movement relative to the shaft 3, between stops 7 and 7'. The intermediate member 5 has an annular flange 22 formed with clutch teeth 6. The first clutch member 1 carries an annular end member 15, which is formed with a radially inwardly directed flange 25, spaced slightly from the clutch teeth 2, with radially inwardly directed flanges 16, 16' and 16", so that there are formed, between the flanges 16 and 25, annular chambers 17, 17' and 17". Oil is supplied to the chamber 17 from a jet 18, and spills over the flanges 16' and 16" successively into the chambers 17' and 17". The object of the annular chambers 17, 17' and 17" is to intercept foreign matter in the oil supplied from jet 18 and thereby to ensure the presence of clean oil in the recess 26 in which the pawls 8 operate. Pawls 8 provided with control springs 8' are mounted on pawl pins 10, the pawls being disposed in an annular recess 26 in the flange 25. The right-hand wall of the flange 25 is cut away between each pawl, as shown in Fig. 5, so as to provide openings 27 which provide free communication between the chamber 17" and the annular recess 26 whereby oil freely enters the recess 26 and forms therein an annulus of oil in which the pawls are totally immersed except for the tips thereof, the oil level being represented by the dotted line in Fig. 5. The intermediate member 5 is formed with a flange 28 on which are formed ratchet teeth 29.

The operation is similar to that of the clutch shown in Figs. 1 and 2, except that the directions of rotation are reversed. Assuming that the shaft 3 is stationary and that the clutch member 1 is rotating in anti-clockwise sense as viewed in the direction of arrow B in Fig. 4, the pawls 8 ratchet past the ratchet teeth 29, the ratcheting movement being damped by the oil in the annular recess 26. If the shaft 3 is now accelerated in the same direction and tends to overrun the shaft 1, pawls 8 are engaged by teeth 29 and the intermediate member 5 is caused to move helically to the right along the shaft 3 into engagement with the stop 7', bringing the clutch teeth 6 cleanly into engagement with the clutch teeth 2 and bringing the ratchet teeth 29 axially out of engagement with the pawls 8. When the shaft 3 is decelerated the intermediate member 5 moves to the left into engagement with the stop 7, bringing the clutch teeth 6 out of engagement with the clutch teeth 2 and bringing the ratchet teeth 29 into ratcheting relation with the pawls 8.

It is a feature of the foregoing constructions that the annulus of oil in the annular chamber 17 of Figs. 1 and 3 and 26 of Fig. 4 is substantially free from disturbance other than that which arises in damping the movement of the pawls by ratcheting, i.e., the damping effect is not impaired by contact of the oil in the annulus with parts in relative rotation other than those parts included in the ratchet drive. The oil supply to jet 18 is desirably filtered, to avoid the accumulation of dirt in the chamber containing the said annulus, and in the case of Fig. 4 the intermediate chambers 17, 17' and 17" constitute further means to separate dirt from the oil reaching the annular recess 26 in which the pawls are mounted.

We claim:

1. A synchronous self-shifting clutch comprising a first rotary clutch member provided with jaw clutch teeth, a second rotary clutch member mounted coaxially with said first clutch member, an intermediate member carried by said second clutch member and provided with jaw clutch teeth, and means constraining said intermediate member for helical movement relative to said second clutch member whereby to bring the clutch teeth of said intermediate member into and out of engagement with the clutch teeth of said first clutch member, and a ratchet drive for initiating precise interengagement of the clutch teeth of said intermediate member and said first clutch member, upon relative angular movement in one direction between said first and second clutch member, said ratchet drive comprising a ring of internal ratchet teeth carried by said first clutch member and spaced axially from the clutch teeth of said first clutch member, and at least one pawl carried by said intermediate member, which pawl in a disengaged condition of the clutch is positioned for cooperation with said ratchet teeth, when there is relative angular movement in said one direction between said first and second clutch members, to draw said intermediate member into toothed engagement with said first clutch member, a chamber open towards the clutch axis, in which said ratchet teeth and the part of the said pawl for cooperation therewith are disposed, and means for continuously feeding liquid to said chamber at least during periods of rotation of said first clutch member to form in said chamber during rotation of said first clutch member an annulus of liquid the radially inner surface of which when undisturbed is radially inward relative to and just clear of said ratchet teeth, and over the surface of which annulus the nose of said pawl can skim at high speeds of rotation of said annulus relative to said pawl when said intermediate member is positioned axially for cooperation between said pawl and said ratchet teeth.

2. A synchronous self-shifting clutch comprising a first rotary clutch member provided with jaw clutch teeth, a second rotary clutch member mounted coaxially with said first clutch member, an intermediate member carried by said second clutch member and provided with jaw clutch teeth, and means constraining said intermediate member for helical movement relative to said second clutch member whereby to bring the clutch teeth of said intermediate member into and out of engagement with the clutch teeth of said first clutch member, a toothed auxiliary member, means constraining said auxiliary member for helical movement relative to said intermediate member between stops on said intermediate member, a ratchet drive for initiating precise interengagement of the clutch teeth of said intermediate member and said first clutch member upon relative angular movement in one direction between said first and second clutch members, said ratchet drive comprising a ring of internal ratchet teeth carried by said first clutch member and spaced axially from the clutch teeth of said first clutch member and at least one pawl carried by said auxiliary member, which pawl in a disengaged condition of the clutch is positioned for cooperation with said ratchet teeth, when there is relative angular movement in said one direction between said first and second clutch members, to draw said auxiliary member into toothed engagement with said first clutch member to initiate precise interengagement of the clutch teeth of said intermediate member and said first clutch member, a chamber open towards the clutch axis, in which said ratchet teeth are disposed, and means for continuously feeding liquid to said chamber at least during periods of rotation of said first clutch member, said chamber being dimensioned to form therein during rotation of said first clutch member an annulus of liquid the radially inner surface of which when undisturbed is radially inward relative to said ratchet teeth.

3. A synchronous self-shifting clutch according to claim 2 wherein said chamber is dimensioned so that the said radially inner surface of the said annulus of liquid is out of contact with parts, other than said pawl, that can rotate relatively to said annulus.

4. A synchronous self-shifting clutch according to claim 2 wherein said chamber includes a radially inwardly directed wall that in axial sense separates said chamber from the clutch teeth of said first clutch member and of said intermediate member.

5. A synchronous self-shifting clutch comprising a first rotatable clutch member provided with clutch teeth, a second rotatable clutch member mounted coaxially with said first clutch member, an intermediate member carried by said second clutch member and provided with clutch teeth, and means constraining said intermediate member for helical movement relative to said second clutch member whereby to bring the clutch teeth of said intermediate member into and out of engagement with the clutch teeth of said first clutch member, and a ratchet drive for initiating precise interengagement of the clutch teeth of said intermediate member and said first clutch member upon relative angular movement in one direction between said first and second clutch members, said ratchet drive comprising a ring of external ratchet teeth carried by said intermediate member and spaced axially from the clutch teeth of said first clutch member, and at least one pawl carried by said first clutch member, a chamber carried by said first clutch member and open towards the clutch axis, and means for continuously feeding liquid to said chamber at least during periods of rotation of said first clutch member, said pawl having at least a major part disposed within said chamber.

6. A synchronous self-shifting clutch according to claim 5 wherein said chamber is so dimensioned that during rotation of said first clutch member the radially inner surface of the liquid in said chamber when undisturbed is clear of said ratchet teeth.

7. A synchronous self-shifting clutch according to claim 5 wherein said chamber includes a wall that in axial sense separates said chamber from the clutch teeth of said first clutch member and said intermediate member.

8. A synchronous self-shifting clutch comprising a first rotatable clutch member provided with clutch teeth, a second rotatable clutch member mounted coaxially with said first clutch member, an intermediate member carried by said second clutch member and provided with clutch teeth, and means constraining said intermediate member for helical movement relative to said second clutch member whereby to bring the clutch teeth of said intermediate member into and out of engagement with the clutch teeth of said first clutch member, and a ratchet drive for initiating precise interengeagement of the clutch teeth of said intermediate member and said first clutch member upon relative angular movement in one direction between said first and second clutch members, said ratchet drive comprising a ring of external ratchet teeth carried by said intermediate member and spaced axially from the clutch teeth of said first clutch member, and at least one pawl carried by said first clutch member, a chamber carried by said first clutch member and open towards the clutch axis, and means for continuously feeding liquid to said chamber at least during periods of rotation of said first clutch member, said pawl having at least a major part disposed within said chamber, and said chamber being so dimensioned that during rotation of said first clutch member an annulus of liquid is formed in said chamber.

9. A synchronous self-shifting clutch according to claim 8 wherein said chamber is dimensioned so that the radially inner surface of the said annulus of liquid is radially outward with respect to said ratchet teeth.

10. A synchronous self-shifting clutch comprising a first rotary clutch member provided with jaw clutch teeth, a second rotary clutch member mounted coaxially with said first clutch member, an intermediate member carried by said second clutch member and provided with jaw clutch teeth, and means constraining said intermediate member for helical movement relative to said second clutch member whereby to bring the clutch teeth of said intermediate member into and out of engagement with the clutch teeth of said first clutch member, and a ratchet drive for initiating precise interengagement of the clutch teeth of said intermediate member and said first clutch member, upon relative angular movement in one direction between said first and second clutch members, said ratchet drive comprising a ring of internal ratchet teeth carried by said first clutch member and spaced axially from the clutch teeth of said first clutch member, and at least one pawl carried by said intermediate member, which pawl in a disengaged condition of the clutch is positioned for cooperation with said ratchet teeth, when there is relative angular movement in said one direction between said first and second clutch members, to draw said intermediate member into toothed engagement with said first clutch member, a chamber open towards the clutch axis, in which said ratchet teeth are disposed, and means for continuously feeding liquid to said chamber at least during periods of rotation of said first clutch member, said chamber being dimensioned to form therein during rotation of said first clutch member an annulus of liquid the radially inner surface of which when undisturbed is radially inward relative to said ratchet teeth, and is out of contact with parts, other than said pawl, that can rotate relative to said annulus.

11. A synchronous self-shifting clutch comprising a first rotary clutch member provided with jaw clutch teeth, a second rotary clutch member mounted coaxially with said first clutch member, an intermediate member carried by said second clutch member and provided with jaw clutch teeth, and means constraining said intermediate member for helical movement relative to said second clutch member whereby to bring the clutch teeth of said intermediate member into and out of engagement with the clutch teeth of said first clutch member, and a ratchet drive for initiating precise interengagement of the clutch teeth of said intermediate member and said first clutch member, upon relative angular movement in one direction between said first and second clutch members, said ratchet drive comprising a ring of internal ratchet teeth carried by said first clutch member and spaced axially from the clutch teeth of said first clutch member, and at least one pawl carried by said intermediate member, which pawl in a disengaged condition of the clutch is positioned for cooperation with said ratchet teeth, when there is relative angular movement in said one direction between said first and second clutch members, to draw said intermediate member into toothed engagement with said first clutch member, a chamber open towards the clutch axis, in which said ratchet teeth are disposed, and means for continuously feeding liquid to said chamber at least during periods of rotation of said first clutch member, said chamber being dimensioned to form therein during rotation of said first clutch member an annulus of liquid the radially inner surface of which when undisturbed is radially inward relative to said ratchet teeth, and includes a radially inwardly directed wall that in axial sense separates the said chamber from the clutch teeth of said first clutch member and of said intermediate member.

12. A synchronous self-shifting clutch comprising a first rotary clutch member provided with jaw clutch teeth, a second rotary clutch member mounted coaxially with said first clutch member, an intermediate member carried by said second clutch member and provided with jaw clutch teeth, and means constraining said intermediate member for helical movement relative to said second clutch member whereby to bring the clutch teeth of said intermediate member into and out of engagement with the clutch teeth of said first clutch member, and a ratchet drive for initiating precise interengagement of the clutch teeth of said intermediate member and said first clutch member, upon relative angular movement in one direction between said first and second clutch members, said ratchet drive comprising a ring of internal ratchet teeth carried by said first clutch member and spaced axially from the clutch teeth of said first clutch member, and at least one pawl carried by an element of said intermediate member, which pawl in a disengaged condition of the clutch is positioned for cooperation with said ratchet teeth, when there is relative angular movement in said one direction between said first and second clutch members, to draw said intermediate member into toothed engagement with said first clutch member, a chamber open towards the clutch axis, in which said ratchet teeth are disposed, and means for continuously feeding liquid to said chamber at least during periods of rotation of said first clutch member, said chamber being dimensioned to form therein during rotation of said first clutch member an annulus of liquid the radially inner surface of which when undisturbed is radially inward relative to said ratchet teeth, and is out of contact with parts, other than said pawl and the adjacent portion of said pawl carrying element, that can rotate relative to said annulus.

References Cited in the file of this patent

UNITED STATES PATENTS

| | | |
|---|---|---|
| 2,323,353 | Plog | July 6, 1943 |
| 2,770,979 | Sinclair | Nov. 20, 1956 |

FOREIGN PATENTS

| | | |
|---|---|---|
| 539,234 | Italy | Feb. 8, 1956 |
| 1,135,871 | France | Dec. 22, 1956 |